April 19, 1960 H. G. NORDLIN Re. 24,813

ELECTROMAGNETIC DELAY CABLE

Original Filed May 11, 1954

INVENTOR
HENRY G. NORDLIN
BY Henry Kolin
AGENT

United States Patent Office

Re. 24,813
Reissued Apr. 19, 1960

24,813

ELECTROMAGNETIC DELAY CABLE

Henry G. Nordlin, Livingston, N.J., assignor to International Telephone and Telegraph Corporation, Nutley, N.J., a corporation of Maryland Original No. 2,854,640, dated September 30, 1958, Serial No. 428,879, May 11, 1954. Application for reissue October 22, 1959, Serial No. 848,172

8 Claims. (Cl. 333—31)

Matter enclosed in heavy brackets [ ] appears in the original patent but forms no part of this reissue specification; matter printed in italics indicates the additions made by reissue.

This invention relates to devices for providing known amounts of time delay of electric signals. It is particularly directed to a distributed-parameter electromagnetic delay cable having a relatively high time delay.

Basically, two types of devices are used for providing known amounts of time delay of electric signals. Ultrasonic devices are used to provide time delays from several microseconds to several milliseconds in duration. However, because of the large fixed insertion losses of these electromechanical transducers, they are most efficiently used where relatively large time delays are desired. Where time delays of from a fraction of a microsecond to about 10 microseconds are required, electric delay devices are generally preferred. These devices have no fixed insertion losses and, for a given design, the attenuation is proportional to the amount of time delay. Furthermore, they are comparatively free from sensitivity to mechanical shock and changes in temperatures, which often adversely affect the performance of the ultrasonic devices.

The electric delay lines in present use are of two types: lumped parameter and distributed parameter. These are both essentially composed, in a four-terminal network, of a series inductance and shunt capacitance. The resistance and dielectric dissipation are inherent properties of the inductance and capacitance, respectively. An example of a simple type of lumped-parameter delay line is the constant-k low-pass filter. This device exhibits a time-delay characteristic which begins to increase with frequency about a decade below the cut-off frequency. By increasing the number of inductance sections in the low-pass constant-delay line, we obtain ultimately a line in which the parameters of inductance and capacitance are distributed uniformly between the input and output terminals. This results in essentially a distributed-parameter delay line. Such a line does not exhibit the sharp cut-off frequency found with the lumped-constant device. In general, distributed-parameter delay lines can be designed to have a greater useful bandwidth than lumped-parameter lines of equivalent size and time delay.

Various methods and cable structures have been employed heretofore for the manufacture of distributed-parameter electromagnetic delay cables. Thus, it is a well-known practice in the cable art to have an electromagnetic delay cable of a substantially coaxial nature comprising a dielectric core, a helix of insulated wire wound around this core, possibly a layer of dielectric material covering the helix, an outer conductor of a metallic braid and finally a protective jacket about this braid. Delay cables of this conventional physical and electrical design are suitable for many applications.

However, where delay cables are required having a low attenuation, a high time delay per unit volume and a relatively uniform time delay with changes in frequency, the use of the aforementioned structure completely fails to meet the required physical and electrical parameters. To provide a time delay of the order of a microsecond per foot, a high value of inductance for a given length of cable is required. It has been suggested heretofore that the inductance of a delay line may be increased by using an iron-powder core for the dielectric core. While use of such a technique has resulted in an increase of inductance, it has at the same time been accompanied by an undesirable increase in attenuation. Furthermore, the techniques used have generally involved the aligning of discrete iron cores on an insulated rod. This makes for a relatively rigid cable structure unsuitable for most desired applications and not readily adaptable for production on existing cable manufacturing equipment.

Another important and desirable characteristic of electromagnetic delay lines is the obtaining of a constant time delay with changes in frequency. This has become of increasing importance in the transmission of various electrical intelligence by coaxial cables. Thus a phase-compensated or delay-compensated cable is of industrial importance, for example, for use as a delay element in color television receivers. It has also been suggested that changes in the time delay of the cable with respect to frequency might be compensated for by use of so-called floating patches serving as compensating capacitive elements. In such a technique, small pieces of metallic foil of suitable dimensions are affixed to the cable core by cementing or by use of an adhesive tape. With such a method, it is extremely difficult to maintain the pieces of foil uniformly spaced and fixedly positioned. Equalization is erratic; the method is at best a mere laboratory curiosity. Only short lengths of cable can be produced thereby, and the method is obviously unsuitable and unsatisfactory for large-scale production techniques for obtaining continuous lengths of phase-compensated cable.

It is an object of the present invention therefore to provide an improved electromagnetic delay line having a low attenuation and a relatively high time delay.

It is a further object to provide a cable having a nominal time delay for a given physical volume in excess of time delays obtainable with electromagnetic cables currently available.

It is still an additional object to provide an electromagnetic delay cable having a compensated delay with respect to frequency.

It is still a further object to provide a suitable process for the fabrication of such electromagnetic delay cables.

An important feature of this invention consists in increasing the inductance of the cable core, while maintaining the attenuation losses at a low value, by use of a novel high-permeability core construction. Specifically, a ferromagnetic spinel incorporated in a polymeric binder is used for the cable core.

As another important feature of this invention phase compensation with increasing frequency is obtained by using a metallized tape spiraled around the cable core. The metallized surface of the tape is divided so as to provide individual, isolated compensating capacitive sections. It has been found that the divisions may preferably be obtained by use of a low-current spark-discharge technique. Other objects and features of this invention will become apparent from the following figures and description wherein.

Figure 1:
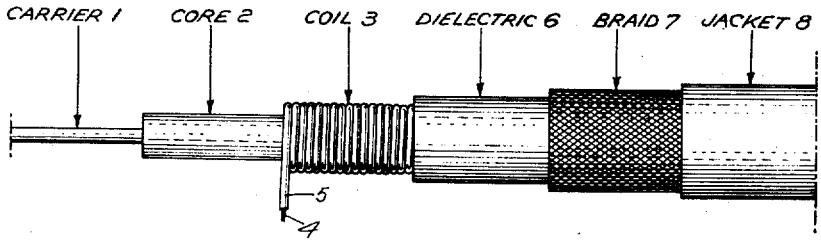
Fig. 1 is an elevational view of an electromagnetic delay cable with the various layers making up one cable embodiment of this invention cut away to show the internal construction.

Basically, the distributed parameter electromagnetic delay cable used is of coaxial construction. Referring to Fig. 1, the inner carrier 1 serves structurally as a support about which the magnetic layer 2 may be extruded. The carrier 1 is preferably a non-conductive carrier. A material such as fiber-glass is preferred therefor. For the inner core 2 a ferromagnetic composition is used. While the use of powdered iron, such as iron obtained by the carbonyl reduction process, has been suggested for the core material, I have found that attenuation losses in using such iron-powder cores tend to become excessive with increasing frequency. This is in part due to the relatively high conductivity of such cores. However, I have found that by incorporating a ferrite material in a polymeric composition, a useful high-permeability relatively lower loss magnetic core may be obtained thereby. Many ferrites are known to possess desirable ferromagnetic properties and these are considered suitable for use in the practice of my invention. By use of the term ferrites, I refer to those substances known as ferromagnetic spinels, ferrospinels, or ferrates (III), a species of non-metallic cubic crystalline material containing iron in combined form. These materials of spinel structure are formed at high temperatures by solid-phase reaction of iron oxide and one or more of certain other metal oxides. They are ceramic-like ferromagnetic material characterized by high permeabilities, up to greater than 1200, high electric resistivity, up to $10^8$ ohm-centimeters and relatively low losses at moderately high frequencies. They possess the empirical chemical formula of $X \cdot Fe_2O_4$ where X represents one or more bivalent metals, generally selected from the group consisting of cobalt, nickel, zinc, manganese, cadmium and magnesium. I have found, for example, that a cobalt ferrite or a manganese-nickel-zinc ferrite incorporated in a polyethylene dispersion is suitable for my purpose. Such ferrites are commercially available as Croloy BX–114 and Ferramic C, respectively.

The closely wound helical coil 3 consists of a wire 4 with an insulating coating 5, this wire being closely wound over the inner core and of a substantially uniform diameter. Although any of several insulating materials such as polyethylene, a polyethylene-polyisobutylene mixture, polyvinyl chloride, polyvinyl chloride-acetate copolymer, polymonochlorotrifluorethylene, polytetrafluoroethylene, or acetal-type resins may be used for the insulating coating 5 of the helically wound wire, the use of insulating materials having a low electrical dissipation factor is desirable. It is also important that the insulation be very uniformly coated on the wire. For a preferred embodiment of my insulated helically wound wire, I prefer to use a polyvinyl acetal coated wire commercially available as Formex No. 40–F wire.

The dielectric layer 6 may consist of any suitable cable dielectric material such as the insulating materials mentioned above for the coating 5. The braid 7, serving as the outer conductor, is preferably of copper. I have found that to obtain the lowest attenuation and the highest time delay the use of insulated wires in the braid structure is desirable. Thus, the braid may be made up of fine insulated wires such as those commercially available as No. 35 HF Formex wire. For the jacketing material 8, an elastomeric composition comprising preferably a vinyl chloride polymer plasticized with a non-migratory, non-contaminating polyester type plasticizer may be used.

Although the design of a delay cable in coaxial form is conventional and preferable in the art, for certain specialized applications, outer conductors other than a braid type structure may be used. Thus, a ferrite-containing core may be provided with an insulated conductor wound thereon and with a ground return serving as the outer conductor. This type of non-coaxial delay cable construction may be used, for example, where the delay cable is in an enclosed metallic chassis, the chassis serving as the outer conductor.

Figure 2:
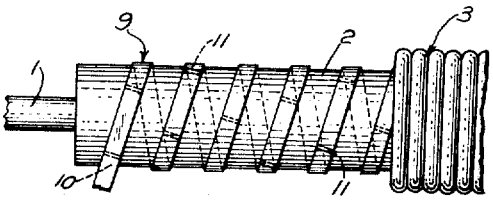
Fig. 2 is an elevational view of a preferred embodiment of the electromagnetic delay cable using isolated phase-compensating metallic sections.

In Fig. 2 is shown the basic cable structure illustrated in Fig. 1, with the added feature of the metallized-layer tape wound about the magnetic core 2. This metallized tape 9 consists of a very thin base layer of a high polymeric film, such as one of polyvinyl chloride, polyvinyl chloride-acetate copolymer, polytetrafluoroethylene, polyethylene, or a polyester resin, with a metallized layer 10 present on one side. It is important for the purposes of this invention that this base film be as thin as possible, preferably less than .001 inch in thickness. The metallized layer 10, applied to one face of the tape, generally by an evaporation technique, may be of any conductive material and preferably one of high conductivity such as silver, copper, aluminum, nickel, or tin. I have found that a thin tape particularly satisfactory for the purposes of this invention, is a metallized polyester resin tape 0.00025 inch in thickness and having an integrally bonded layer of aluminum thereon. A suitable polyester resin tape is available under the name of Du Pont Mylar, the trade name for a polyester resin that is a polymeric condensation product of terephthalic acid and ethylene glycol. It is also available under the name of Terylene.

Figure 3:
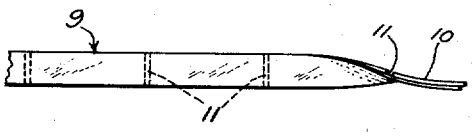
Fig. 3 is an elevational view of the metallized tape shown in the embodiment of Fig. 2.

In Fig. 3 is shown an enlarged view of the metallized tape. It has been found that the dimensions of the tape and the uniform dispersion of metallic areas thereon are of importance in obtaining uniform phase compensation for given delay values. Conducting units or areas are formed on the tape by creating gaps or dividing lines 11 on the metal film with a low-current arc. The tape thus prepared is wound on the delay cable core 2 with the metallized surface preferably in direct contact with the core before applying the helical inner conductor 3. The frequency band over which the compensation is effective is determined by the length of the tape patches and by the pitch of the tape winding on the core. It is apparent that the degree of compensation obtained will be affected by the width of the tape and the thickness of the insulation. It has been found that even for tape thicknesses as low as 0.00025 inch, this method of obtaining phase compensation is readily adapted to high-speed production with the use of conventional taping machinery.

In winding the metallized tape about the ferrite core, I have found that for the purposes of this invention the metallized surface of the tape may be either in direct contact with the core or in direct contact with the insulation of the helical inner conductor. Where the base layer of the tape is relatively thin, as for certain types of delay cables, it is not too material for the purposes of this invention as to how the metallized surface of the tape is disposed with respect to the inner conductor. Generally, I prefer to have the metallized surface in direct contact with the core and thereby provide some additional insulation between the metallized areas and the inner conductor. Thus, the possible occurrence, because of the thinness of the insulation about the inner conductor, of shorted areas between the inner conductor and the metallized area of the tape is prevented.

Figure 4:
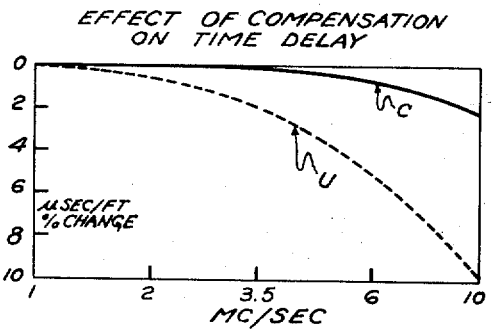
Fig. 4 is a graphical comparison of the percentage change in time delay vs. frequency for phase-compensated and uncompensated cables.

In Fig. 4 the percentage change in time delay versus frequency for two electromagnetic delay cables is plotted over a frequency range between 1 and 10 megacycles. Curve U shows the percentage change in time delay with frequency change for an uncompensated cable such as that shown in Fig. 1. Curve C shows the percentage change in time delay for a compensated cable such as that shown in Fig. 2. As may be seen from an examination of the curves of Fig. 4, the time delay over the same frequency range for the compensated cable is reduced by less than 2% whereas that for the uncompensated cable is reduced by approximately 10%. Furthermore, the percentage difference between the two cables is greatest at the high-frequency end, which is considered the more critical frequency portion in the time-delay applications of these cables.

Figure 5:
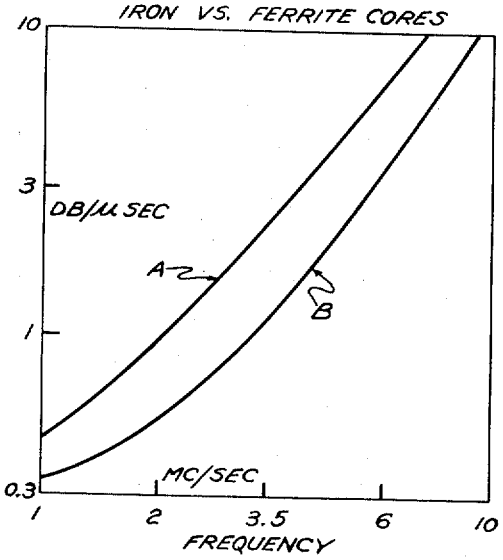
Fig. 5 is a graphical comparison of the change in attenuation obtained vs. frequency for an electromagnetic delay cable using an iron-powder core and one prepared with a ferrite core in accordance with this invention.

In Fig. 5 the attenuation in decibels per microsecond is plotted against the frequency in megacycles per second. Curve A represents an electromagnetic cable using an iron-core construction. Curve B represents one with a ferrite-core construction in accordance with this invention. These two cables have been compared for equivalent physical dimensions, time delays, and volume contents of magnetic powders. As may be seen from the curves, an improvement in attenuation characteristics of almost 250% is obtained by use of the ferrite-core construction.

It will be realized that the specific dimensions of the metallic areas formed on the metallized tape 9 are a function of various theoretical considerations. While it is not my purpose to be limited thereby, the following is intended as an explanation of the mode of operation of this cable including the manner of determining the various parameters of the components thereof for obtaining the desired performance characteristics particularly with respect to phase compensation. Thus, the characteristic impedance and the time delay of a cable of this type are given by the following equations:

$$Z_0=\sqrt{\frac{L}{C}}$$

and $$T_d=\sqrt{LC}$$

where L and C represent the inductance and capacitance respectively of a given length of cable, $Z_0$ is the characteristic impedance in ohms and $T_d$ is the time delay in microseconds per unit of length. If the inductance of the particular cable is increased by a factor $\mu_e$ by using a magnetic type core, the time delay and impedance of the cable are increased by the factor $\sqrt{\mu_e}$. The time delay per unit volume of cable is thereby increased. In addition, a desirable decrease in the ratio of attenuation to time delay results if the magnetic losses of the core such as those due to eddy currents and other electrical dissipation are small. The method of time-delay equalization of delay cables by the use of isolated metallic units insulated from the helical inner conductor is based upon the following considerations. The decrease in time delay at high frequencies because of a decrease in inductance is compensated for in accordance with the LC formula by an increase in the effective distributed capacitance. A substantially constant time delay is obtained up to frequencies at which the metallized areas are approximately one-half wavelength long. The degree of equalization is a function of the width of the areas, the dielectric constant of the insulation and the thickness of the insulation between these metallized areas and the inner conductor.

The decrease in inductance which makes this type of phase compensation necessary and desirable is due to the nature of the mutual coupling which is present among turns of the helical inner conductor. At low frequencies where the wavelength in the cable is relatively long, the adjoining turns act as coupled filters essentially in phase, and the mutual coupling enhances the inductance. However, as the frequency is increased, the phase difference between the mutually coupled filters increases and partial cancellations occur which result in a decrease in the inductance. The capacitive metallized units have their most significant effect at high frequencies where a large phase difference exists along the length of each unit. As the frequency is increased and the phase difference increases, current flows through these metallized areas and the effective capacitance of the cable is thereby increased.

In accordance with the foregoing, inasmuch as the capacitance between the metallic units and the inner conductor is of determining importance, I have contemplated winding the metallized tape above the inner conductor rather than subjacent thereto, as shown in the embodiment of Fig. 2. This method provides for the establishment of capacitance between the metallic units and the inner conductor. However, additional theoretical considerations enter into the calculations because of the presence of the metallized areas in the principal field of the cable.

As an example of a specific cable construction illustrating the embodiment shown in Fig. 2, the following type of cable was made. For the carrier 1, a non-conductive uniform diameter flexible cord was used of a nominal diameter of 0.030 inch. The cord was made of glass fibers, such as is commercially available under the trade name of Fiberglas. Over this cord was extruded the paramagnetic ferrite core. This core had a nominal diameter of 0.171 inch with a tolerance of ±0.003 inch. It was found that in order to obtain the high nominal time delay of 1.0 microsecond per foot the compound must have an effective permeability of 3.0 in the core; that is, it must cause the cable inductance to be multiplied by a factor of 3.0. It was found that the proportion of ferrite powder in the mixture could be raised to as high as 90% and a compound of desired permeability and suitable for extrusion in conventional equipment could still be obtained. While smaller amounts of ferrite could be conveniently incorporated in the mixture, the core so obtained would obviously not have as high a permeability. The following compositions were among those found suitable for use, and highly reproducible results were obtained therewith:

EXAMPLE I

| | Parts by weight |
|---|---|
| Polyisobutylene, Vistanex B–140 | 2 |
| Polyethylene, Bakelite DE–3401 | 1 |
| Ferrite, Croloy BX–114, —200 mesh | 20 |

EXAMPLE II

| | |
|---|---|
| Polyisobutylene, Vistanex B–140 | 1 |
| Polyethylene, Bakelite DE–3401 | 2 |
| Ferrite, Ferramic C, —200 mesh | 27 |

It was found that to obtain a high-permeability moldable material the magnetic core compound must be mixed for a length of time sufficient to obtain a high degree of homogeneity. The plastic mixture as shown in Examples 1 and 2 was first compounded at 350° F. and batches were then mixed in a Banbury mixer for 15 minutes at a temperature of 375° F. After the desired high degree of homogeneity had been obtained, the compound was sheeted on a differential mill and granulated in a form suitable for extrusion. It was found desirable for the purposes of this invention to maintain the diameter of the core within a close tolerance in order to obtain satisfactory uniformity in the time-delay characteristic. Because the core compound is of much greater density than the dielectric extrusion compounds ordinarily used in the cable art, the conditions required for proper extrusion are somewhat unusual in several respects. Thus, the extrusion rate is much lower than that ordinarily used for a material such as polyethylene. The following conditions are shown for purposes of illustration of various extrusion procedures used. An oil-heated extruder was used having a 1½ inch diameter screw. The head and front barrel temperatures were maintained at 510° F. The rear barrel temperature was kept slightly lower, at 500° F. The extrusion rate was maintained at 10 ft. per minute. To eliminate sagging occurring in the cable core between the extruded tip and the first take-up guide because of the high density of the material, it was found desirable to water-cool the cable core at as near the extruder as practicable. Increasing the rate of extrusion at a given temperature was found to result in tearing and in occasional separation of the core. It will be apparent to those skilled in the molding art that the rate of extrusion can be increased at elevated extruder temperatures. However, the limitation in this respect is the decomposition point of the polyethylene-polyisobutylene compound which could adversely affect the strength of the core. In typical cables produced, it was found that the core could be bent double and flexed repeatedly without breakage occuring. The ferrite cores, as illustrated in Fig. 5, also show much lower attenuation losses compared wtih the carbonyl iron cores.

For forming the isolated metallic units a metalized polyester type 0.00025 inch (¼-mil) thick Mylar film having an evaporated coating of aluminum on one side was used. Conducting patches are formed on this type of material by creating dividing lines on the aluminum by use of a 60-cycle low-current arc. This may be accomplished, for example, by using a stainless steel roller which is rolled across the metal surface with 80 volts applied between the roller and the aluminum film through a 600-ohm current-limiting resistor. The roller is tapered, and the width of the contacting edge determines to some extent the width of the resulting dividing line. It is apparent that this method lends itself readily to large-scale, continuous, automatic mass-production techniques. Other mass-production techniques for obtaining metallized areas on a polymeric film are also feasible. Thus, the base film may first be treated with specific chemical compounds at regular spaced portions thereof so that metal deposited by evaporation or otherwise upon the film does not adhere to these treated portions; thereby isolated metallic areas are obtained. The use of silk-screen painting techniques and lithographic methods is also contemplated for the obtaining of the spaced-apart metallic areas.

The tape with the isolated metallic areas is wound on the cable core, as previously stated, with the metalized surface preferably facing the core before applying the helical inner conductor. As mentioned, the frequency band in which the compensation is effective is determined by the tape length of the metallized areas and the pitch of the tape winding. It was found that with ¼ mil-thick metallic areas having a resistivity of approximately 1 ohm per square, metallic units of ⅛ inch width and ½ inch in length and wound with a pitch of 5/16 inch were satisfactory for this purpose. Because of the relatively thin film used, approximately 0.25 mil in thickness, the over-all dimensions of the compensated and uncompensated cable do not differ substantially. It should be observed that in addition to the smaller change of time delay with frequency for a compensated vs. an uncompensated cable, as shown in Fig. 4, a marked superiority in response to passage of a rectangular pulse was shown by the compensated delay cable. Thus, in a comparison between two similar cables, the rise time for an uncompensated cable was approximately 0.12 microsecond compared with 0.06 microsecond for the compensated cable, or a 2:1 difference in favor of the compensated cable.

The inner conductor 3 is wound uniformly with a spacing of 10% between turns. For the cable described, a nominal outside diameter of 0.178±0.003 inch is maintained. As mentioned, a polyvinyl acetal insulated wire such as No. 40–F Formex insulated magnet wire is preferred. While the outer conductor may be formed directly over the insulated helical inner conductor, it is generally considered preferable to additionally insulate the inner conductor. While an extruded polyethylene layer or a dip-coated polytetrafluoroethylene layer may be deposited, I prefer for the purposes of this invention to wrap a thin polyethylene tape in overlapping fashion over the insulated inner conductor. Polyethylene tape available as Bakelite DE–3401 0.0015-inch-thick by ½ inch-wide tape has been found highly suitable for use. An overlap of approximately 50% is preferable. The outer conductor 7 consists of a braid, preferably of copper. To obtain the lowest degree of attenuation, this braid should be insulated. A commercially available material such as No. 36–HF Formex insulated magnet wire is suitable for this purpose. In addition to the jacketing materials mentioned, I have found that a material such as polyethylene filled with aluminum flake, thereby providing a heat-reflecting surface, is particularly suitable for the outer jacket 8.

While I have described above the principles of my invention in accordance with specific products and process steps, it is to be clearly understood that this description is made only by way of example and not as a limitation to the scope of my invention as set forth in the objects thereof and in the accompanying claims.

I claim:

1. A flexible electromagnetic delay cable comprising a flexible paramagnetic ferrite-containing core, a helically wound tape [in overlying relation to] *wound around* said core *and* having a given pitch, the turns of said tape being separated one from the other on the surface of said core to provide said given pitch, a plurality of discrete capacitive units bonded to said tape in spaced relation along said helically wound tape and disposed to follow said given pitch to thereby provide a predetermined phase compensation over a given frequency band, and a coil of insulated wire wound on said core in overlying relation to said units.

2. A flexible electromagnetic delay cable comprising a flexible paramagnetic ferrite-containing core, a helically wound tape [in overlying relation to] *wound around* said core *and* having a given pitch, the turns of said tape being separated one from the other on the surface of said core to provide said given pitch, a plurality of discrete capacitive units bonded to said tape in spaced relation along said helically wound tape and disposed to follow said given pitch to thereby provide a predetermined phase compensation over a given frequency band, and a coil of insulated wire wound on said core in overlying relation to said capacitive units, said capacitive units comprising a metallized insulating film with the metallized layer divided into electrically separated areas.

3. A flexible electromagnetic delay cable comprising a flexible paramagnetic ferrite-containing core, a helically wound tape [in overlying relation to] *wound around* said core *and* having a given pitch, the turns of said tape being separated one from the other on the surface of said core to provide said given pitch, a plurality of discrete capacitive units bonded to said tape in spaced relation along said helically wound tape and disposed to follow said given pitch to thereby provide a predetermined phase compensation over a given frequency band, and a coil of insulated wire wound on said core in overlying relation to said capacitive units, said capacitive units comprising a metallized insulating film with the metallized layer divided into electrically separated areas, said metallized film consisting of a layer of aluminum on a polymeric condensation product of terephthalic acid and ethylene glycol.

4. A flexible, electromagnetic delay cable comprising a central flexible carrier, a flexible paramagnetic ferrite-containing core disposed about said carrier, a tape of insulating material, a plurality of discrete capacitive units bonded to said tape, said tape being helically wound about said core, the turns of said tape being separated one from the other to provide a given pitch, said capacitive units being disposed on said tape to follow said given pitch to provide a predetermined phase compensation over a given frequency band, an insulated conductor wound in overlying relation to said tape in the form of a substantially uniform diameter, closely wound coil of insulated wire, an insulated metal braid surrounding said coil of insulated wire, and an elastomeric jacketing material fitting tightly around said metallic braid.

5. *An electromagnetic delay cable comprising a para-*

*magnetic core, a coil of insulated wire wound about said core, a helically wound tape coaxially positioned about said core contiguous to, and in overlapping relationship with, said coil and having a given pitch, the turns of said tape being separated one from the other along said coil to provide said given pitch and a plurality of discrete capacitive units bonded to said tape in spaced relation along said helically wound tape and disposed to follow said given pitch to thereby provide a predetermined phase compensation over a given band.*

*6. An electromagnetic delay cable comprising a paramagnetic core, a coil of insulated wire wound about said core, a helically wound tape surrounding said core and having a given pitch, the turns of said tape being separated one from the other along said coil to provide said given pitch, and a plurality of discrete capacitive units contiguous to said coil and bonded to said tape in spaced relation along said helically wound tape and disposed to follow said given pitch to thereby provide a predetermined phase compensation over a given band.*

*7. An electromagnetic delay cable comprising a paramagnetic core, a coil of insulated wire, a helically wound tape, said core lying within said coil and the helical configuration of said tape and being coaxial with and affixed to said coil and said helical configuration of said tape, said tape having a given pitch, the turns of said tape being separated one from the other with respect to said coil to provide said given pitch and covering substantially the same length relative to said core, and a plurality of discrete capacitive units contiguous to said coil and bonded to said tape in spaced relation along said helically wound tape and disposed to follow said given pitch to thereby provide a predetermined phase compensation over a given band.*

*8. An electromagnetic delay cable comprising a para-*

*magnetic ferrite-containing core, a tape of insulating material, a plurality of discrete capacitive units bonded to said tape, said tape being helically wound about said core, the turns of said tape being separated one from the other to provide a given pitch, said capacitive units being disposed on said tape to follow said given pitch to provide a predetermined phase compensation over a given frequency band and an insulated conductor wound in overlying relation to said tape in the form of a substantially uniform diameter, closely wound coil of insulated wire.*

References Cited in the file of this patent or the original patent

UNITED STATES PATENTS

| | | |
|---|---|---|
| 2,005,360 | Boggs | June 18, 1935 |
| 2,387,783 | Tawney | Oct. 30, 1945 |
| 2,453,313 | Gordon | Nov. 9, 1948 |
| 2,461,061 | Kallmann | Feb. 8, 1949 |
| 2,467,857 | Rubel et al. | Apr. 19, 1949 |
| 2,520,991 | Yolles | Sept. 5, 1950 |
| 2,619,537 | Kihn | Nov. 25, 1952 |
| 2,650,350 | Heath | Aug. 25, 1953 |
| 2,704,829 | Clay | Mar. 22, 1955 |
| 2,727,945 | Prache | Dec. 20, 1955 |
| 2,756,394 | Sieven et al. | July 24, 1956 |

FOREIGN PATENTS

| | | |
|---|---|---|
| 1,047,856 | France | July 29, 1953 |

OTHER REFERENCES

Components Handbook, vol. 19, M.I.T. Radiation Laboratory Series, copyright 1949 by McGraw-Hill Book Co., Inc., page 205.